United States Patent
Danilov et al.

(10) Patent No.: US 11,507,308 B2
(45) Date of Patent: Nov. 22, 2022

(54) DISK ACCESS EVENT CONTROL FOR MAPPED NODES SUPPORTED BY A REAL CLUSTER STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/834,649

(22) Filed: Mar. 30, 2020

(65) Prior Publication Data
US 2021/0303205 A1 Sep. 30, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0689* (2013.01)

(58) Field of Classification Search
CPC .... G06F 3/0659; G06F 3/0673; G06F 3/0616; G06F 3/0611; G06F 3/0652; G06F 3/0604; G06F 3/0689
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,065,020 A | 5/2000 | Dussud | |
| 6,073,218 A * | 6/2000 | DeKoning | G06F 9/52 710/20 |
| 6,108,684 A * | 8/2000 | DeKoning | G06F 9/505 718/100 |
| 6,233,696 B1 | 5/2001 | Kedem | |
| 6,240,527 B1 | 5/2001 | Schneider et al. | |
| 6,502,243 B1 | 12/2002 | Thomas | |
| 6,549,921 B1 | 4/2003 | Ofek | |
| 7,007,044 B1 | 2/2006 | Rafert et al. | |

(Continued)

OTHER PUBLICATIONS

Non-Final Office Action received for U.S. Appl. No. 16/209,185 dated Jun. 18, 2020, 22 pages.
(Continued)

*Primary Examiner* — Kalpit Parikh
(74) *Attorney, Agent, or Firm* — Amin, Turocy & Watson, LLP

(57) ABSTRACT

Disk access event control for mapped nodes of a cluster storage system supporting a redundant array of independent nodes (mapped RAIN) system is disclosed. A mapped RAIN cluster can be allocated on top of one or more real data clusters. In an embodiment, disk access events can be routed via a storage service instance supporting a mapped node. In another embodiment, disk access events can be routed via another storage service instance that does not support the mapped node. Routing the disk access event via another storage service instance that does not support the mapped node can reduce the use of computing resources. Further, the routing of the disk access event can be according to a proportional disk operation value determined based on historical disk access event characteristics.

20 Claims, 10 Drawing Sheets

(56) References Cited

U.S. PATENT DOCUMENTS

| | | |
|---|---|---|
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B2 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1* | 4/2020 | Chatterjee ............... G06F 3/064 |
| 10,644,408 B2* | 5/2020 | Sakai ........................ G01S 7/03 |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,951,236 B2 | 3/2021 | Chen et al. |
| 11,023,331 B2 | 6/2021 | Danilov et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0071546 A1* | 3/2005 | Delaney ............... G06F 3/0658 |
| | | 711/112 |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |

(56) References Cited

U.S. PATENT DOCUMENTS

| | | |
|---|---|---|
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrier et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1* | 12/2016 | Li .............. G06F 3/0617 |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0032279 A1 | 2/2018 | Davis et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Eamesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |

(56) References Cited

U.S. PATENT DOCUMENTS

2021/0255791 A1    8/2021    Shimada et al.
2021/0273660 A1    9/2021    Danilov et al.

OTHER PUBLICATIONS

Martin Hosken, Developing a Hyper-Converged Storage Strategy for VMware vCloud Director with VMware vSAN, Jan. 2018 (Year 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.

(56) References Cited

OTHER PUBLICATIONS

Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf (Year: 2015).
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 21 Pages.
EMC; "EMC ECS (Elastic Cloud Storage) Architectural Guide v2.x", URL : https://www.dell.com/community/s/vjauj58549/attachments/vjauj58549/solutions-ch/477 /1/h14071-ecs-architectural-guide-wp.pdf, Jun. 2015, 21 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/698,096 dated Jan. 5, 2022, 21 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Notice of Allowance dated Sep. 10, 2021 for U.S. Appl. No. 16/745,855, 30 pages.
Office Action dated Nov. 24, 2021 for U.S. Appl. No. 16/526,182, 83 pages.
Notice of Allowance dated Nov. 22, 2021 for U.S. Appl. No. 16/888,144, 71 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Notice of Allowance received for U.S. Appl. No. 16/584,800 dated Jun. 27, 2022, 33 pages.
Notice of Allowance received for U.S. Appl. No. 16/179,486 dated Jun. 8, 2022, 67 pages.
Final Office Action received for U.S. Appl. No. 16/986,222 dated Jun. 17, 2022, 76 pages.
Final Office Action received for U.S. Appl. No. 17/153,602 dated Jul. 14, 2022, 34 pages.
Final Office Action received for U.S. Appl. No. 16/538,984 dated Jun. 1, 2022, 114 pages.
Notice of Allowance received for U.S. Appl. No. 17/333,815 dated Jun. 27, 2022, 27 pages.
Wu et al., "Improving I/O Performance of Clustered Storage Systems by Adaptive Request Distribution," 2006 15th EEE International Conference on High Performance Distributed Computing, 2006, pp. 207-217.
Final Office Action dated Aug. 31, 2022 for U.S. Appl. No. 16/403,417, 37 pages.
Office Action dated Sep. 3, 2021 for U.S. Appl. No. 16/803,913, 23 pages.
Office Action dated Jan. 25, 2022 for U.S. Appl. No. 16/803,913, 25 pages.
Office Action dated May 27, 2022 for U.S. Appl. No. 16/803,913, 24 pages.
RAID vs. non-RAID Storage—Difference & Comparison, https://www.fromdev.com/2014/01/raid-vs-non-raid-storage-difference.html, pp. 1-4, 2014. (Year: 2014).

* cited by examiner

DISK ACCESS EVENT CONTROL FOR MAPPED NODES SUPPORTED BY A REAL CLUSTER STORAGE SYSTEM

TECHNICAL FIELD

The disclosed subject matter relates to data storage, more particularly, to disk access events to mapped disks built on a real storage devices comprised in a real storage pool.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

DETAILED DESCRIPTION

Figure 1:
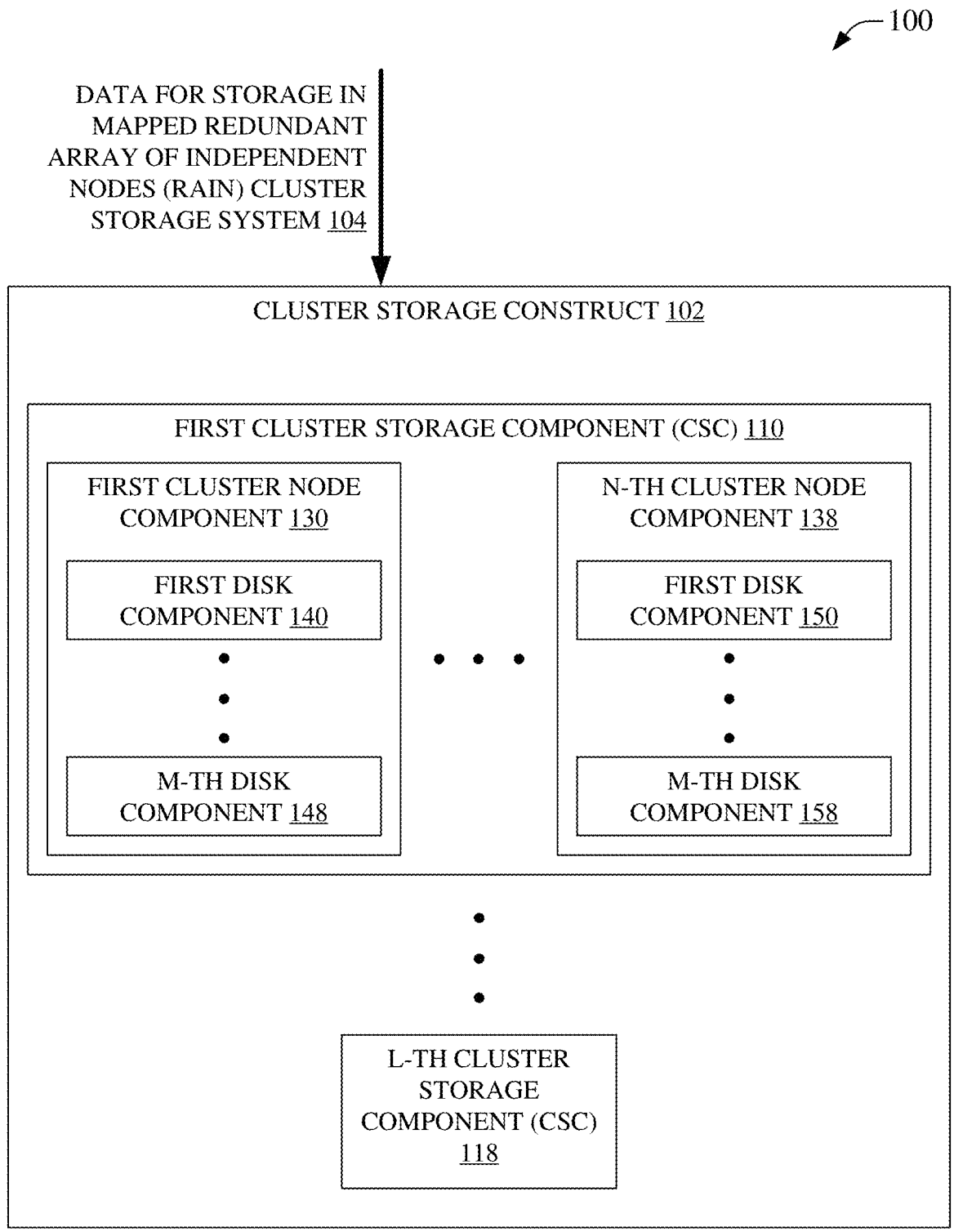
FIG. 1 is an illustration of an example system that can facilitate storage of data in a mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In an embodiment of the presently disclosed subject matter, a mapped redundant array of independent nodes, hereinafter a mapped RAIN, can comprise a mapped cluster, wherein the mapped cluster comprises a logical arrangement of real storage devices. In a mapped cluster, a real cluster(s), e.g., a group of real storage devices comprised in one or more hardware nodes, comprised in one or more clusters, can be defined so allow more granular use of the real cluster in contrast to conventional storage techniques. In an aspect, a mapped cluster can comprise nodes that provide data redundancy, which, in an aspect, can allow for failure of a portion of one or more nodes of the mapped cluster without loss of access to stored data, can allow for removal/addition of one or more nodes from/to the mapped cluster without loss of access to stored data, etc. As an example, a mapped cluster can comprise nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the mapped cluster becomes inaccessible, etc. In other example embodiments, a mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a node of a mapped cluster can comprise one or more disks, and the node can be loosely similar to a disk in a RAID system. Unlike RAID technology, an example mapped RAIN system can provide access to more granular storage in generally very large data storage systems, often on the order of terabytes, petabytes, exabytes, zettabytes, etc., or even larger, because each node can generally comprise a plurality of disks, unlike RAID technologies.

In an embodiment, software, firmware, etc., can hide the abstraction of mapping nodes in a mapped RAIN system, e.g., the group of nodes can appear to be a contiguous block of data storage even where, for example, it can be spread across multiple portions of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide and M disks deep, a mapped RAIN can consist of up to N' mapped nodes and manage up to M' portions of disks of the constituent real nodes. Accordingly, in an embodiment, one mapped node is expected to manage disks of different real nodes. Similarly, in an embodiment, disks of one real node are expected to be managed by mapped nodes of different mapped RAIN clusters. In some embodiments, the use of two disks by one real node can be forbidden to harden mapped RAIN clusters against a failure of one real node compromising two or more mapped nodes of one mapped RAIN cluster, e.g., a data loss event, etc. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey a distinction from a corresponding real physical hardware component.

In an embodiment, a mapped cluster can be comprised in a real cluster, e.g., the mapped cluster can be N' by M' in size and the real cluster can be N by M in size, where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions comprises use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the mapped cluster can be smaller than the real cluster. Moreover, where the mapped cluster is sufficiently small in comparison to the real cluster, the real cluster can accommodate one or more additional mapped clusters. In an aspect, where mapped cluster(s) are smaller than a real cluster, the mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first cluster having hardware nodes in a first data center in Seattle, Wash., and a second data center having hardware nodes in Tacoma, Wash. As another example, a mapped cluster can comprise storage space from a first cluster having hardware nodes in a first data center in Houston, Tex., and a second cluster having hardware nodes in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data in a mapped redundant array of independent nodes, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Cluster storage construct 102 can receive data for storage in a mapped cluster, e.g., data for storage in mapped RAIN cluster storage system 104, etc., hereinafter data 104 for brevity. Disk access events, e.g., accessing a disk for data storage, retrieval, or other operations, can be facilitated by an instance of a storage service that can execute on a processor of a real node. As such, mapped disk operations, e.g., operations logically performed on a mapped disk, etc., can correlate to real operations on real disks of a real cluster according to a mapping of mapped storage devices of a mapped node supported by a real cluster. In an aspect, data 104 can be stored, retrieved, etc., by, from, on, etc., portions of the one or more storage devices of cluster storage construct 102 according to a logical mapping of the storage space, e.g., according to one or more mapped clusters.

In an aspect, a mapped cluster can be a logical allocation of storage space of cluster storage construct 102. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, cluster storage construct 102 can support a mapped cluster enabling data 104 to be stored on one or more disk, e.g., first disk component 140 through M-th disk component 148 of first cluster node component 130 through first disk component 150 through M-th disk component 158 of N-th cluster node component 138 of first cluster storage component (CSC) 110, through disks corresponding to CSCs of L-th cluster storage component 118, according to a mapped cluster schema. In an aspect, a mapped cluster control component, e.g., mapped cluster control component 220, etc., can coordinate storage of, or other access to, data 104 on storage elements, e.g., disks, of a real cluster of cluster storage construct 102 according to a mapping of a mapped cluster, e.g., mapped cluster control component 220-620, etc., can indicate where in cluster storage construct 102 data 104 is to be stored, cause data 104 to be retrieved from a location in in cluster storage construct 102 based on the mapping of the mapped cluster, etc.

In an embodiment, a mapped cluster employing cluster storage construct 102 can be comprised in one or more portions of one or more real cluster, e.g., a portion of one or more disks of first CSC 110-L-th CSC 118, etc. Moreover, the mapped cluster can be N' nodes by M' disks in size and the one or more real clusters of cluster storage construct 102 can be N nodes by M disks in size, where N' can be less than, or equal to, N, and M' can be less than, or equal to, or greater than, M. In these other embodiments, the mapped cluster can be smaller than cluster storage construct 102. Moreover, where the mapped cluster is sufficiently small in comparison to cluster storage construct 102, one or more additional mapped clusters can be accommodated by cluster storage construct 102. In an aspect, where mapped cluster(s) are smaller than cluster storage construct 102, the mapped cluster can provide finer granularity of the data storage system. As an example, where cluster storage construct 102 is 8×8, e.g., 8 nodes by 8 disks, then, for example, four mapped 4×4 clusters can be provided, wherein each of the four mapped 4×4 clusters is approximately ¼th the size of cluster storage construct 102. As a second example, given an 8×8 cluster storage construct 102, 16 mapped 2×2 clusters can be provided where each mapped cluster is approximately ¹⁄₁₆th the size of cluster storage construct 102. As a third example, for the example 8×8 cluster storage construct 102, two mapped 4×8 or 8×4 clusters can be provided and each can be approximately ½ the size of cluster storage construct 102. Additionally, the example 8×8 cluster storage construct 102 can provide a mix of different sized mapped clusters, for example one 8×4 mapped cluster, one 4×4 mapped cluster, and four 2×2 mapped clusters. In some embodiments, not all of the storage space of cluster storage construct 102 must be allocated in a mapped cluster, e.g., an example 8×8 cluster storage construct 102 can comprise only one 4×4 mapped cluster with the rest of cluster storage construct 102 being unallocated, differently allocated, etc.

In some embodiments, a mapped cluster can comprise storage space from more than one real cluster, e.g., first CSC 110 through L-th CSC 118 of cluster storage construct 102. In some embodiments, a mapped cluster can comprise storage space from real nodes, e.g., first cluster node component 130, etc., in different geographical areas. In some embodiments, a mapped cluster can comprise storage space from more than one real cluster in more than one geographic location. As an example, a mapped cluster can comprise storage space from a cluster having hardware nodes in a data center in Denver, e.g., where first CSC 110 is embodied in hardware of a Denver data center. In a second example, a mapped cluster can comprise storage space from a first cluster having hardware nodes in a first data center in Denver and from a second cluster also having hardware nodes in the first data center in Denver e.g., where first CSC 110 and L-th CSC 118 are embodied in hardware of a Denver data center. As a further example, a mapped cluster can comprise storage space from both a cluster having hardware nodes in a first data center in Denver and a second data center in Denver e.g., where first CSC 110 is embodied in first hardware of a first Denver data center and where L-th CSC 118 is embodied in second hardware of a second Denver data center. As a further example, a mapped cluster can comprise storage space from a first cluster having hardware nodes in a first data center in Seattle, Wash., and a second data center having hardware nodes in Tacoma, Wash., e.g., where first CSC 110 is embodied in first hardware of a first Seattle data center and where L-th CSC 118 is embodied in second hardware of a second Tacoma data center. As another example, a mapped cluster can comprise storage space from a first cluster having hardware nodes in a first data center in Houston, Tex., and a second cluster having hardware nodes in a data center in Mosco, Russia e.g., where first CSC 110 is embodied in first hardware of a first Houston data center and where L-th CSC 118 is embodied in second hardware of a second Mosco data center.

Figure 2:
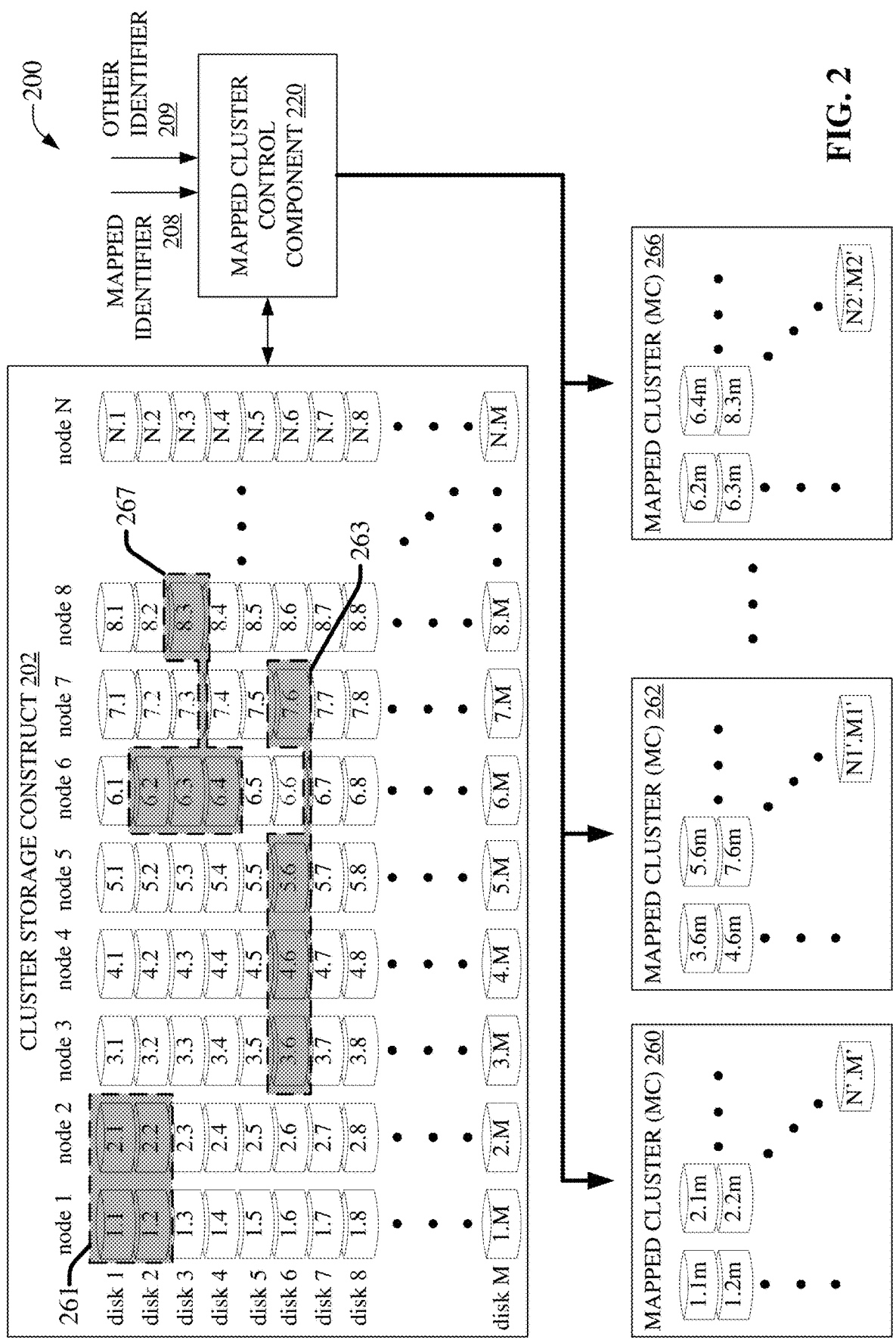
FIG. 2 illustrates an example system that can facilitate storage of data in a mapped redundant array of independent nodes via a plurality of example mapped clusters comprised in more than one real node of a real cluster storage system, in accordance with aspects of the subject disclosure.

FIG. 2 is an illustration of a system 200, which can enable storage of data in a mapped redundant array of independent nodes via a plurality of example mapped clusters comprised in more than one real node of a real cluster storage system, in accordance with aspects of the subject disclosure. System 200 can comprise cluster storage construct 202 that can comprise disk portions 1.1 to N.M, etc. Mapped cluster control component 220 can facilitate allocation of one or more MC, e.g., MC 260-266, etc.

Mapped cluster control component 220 can receive mapped identifier 208, other identifier 209, etc., which identifiers can enable directing data, e.g., data 104, etc., to disk portions of cluster storage construct 202 corresponding to a relevant mapped cluster, e.g., MC 260-266, etc. Mapped identifier 208 can be comprised in received data, e.g., data 104, etc., for example, a customer can indicate mapped identifier 208 when sending data for storage in a mapped cluster. Mapped identifier 208 can also be included in a request to access data. In an embodiment, mapped identifier 208 can indicate a logical location in a mapped cluster that can be translated by mapped cluster control component 220 to enable access to the a real location of a disk portion in cluster storage construct 202. This can allow use of a logical location to access, e.g., read, write, delete, copy, etc., data from a physical data store. Other identifier 209 can similarly be received. Other identifier can indicate a real location rather than a mapped location, e.g., mapped cluster control component 220 can provide a real location based on the mapping of a mapped cluster, and such real location can then be used for future access to the real location corresponding to the mapped location.

In an embodiment, mapped cluster 260 can comprise, for example, disk portion 1.1m, 1.2m, 2.1m, 2.2m, . . . , N'.M', mapped cluster 262 can comprise, for example, disk portion 3.6m, 4.6m, 5.6m, 7.6m, . . . , N1'.M1', and mapped cluster 266 can comprise, for example, disk portion 6.2m, 6.3m, 6.4m, 8.3m, . . . , N2'.M2'. The example disk portions can map back to corresponding disk portions of cluster storage construct 202, e.g., MC 260 can map to disk portions 261 of cluster storage construct 202, MC 262 can map to disk portions 263 of cluster storage construct 202, MC 266 can map to disk portions 267 of cluster storage construct 202, etc. As can be observed, example system 200 can conform to a constraint(s), for example to reduce a potential for a data loss event, etc., e.g., no real node can contribute storage space to any two mapped clusters of mapped nodes, though this can still allow a real node to contribute to more than one mapped node of one mapped cluster. Additionally, system 200 illustrates that mapped clusters can comprise contiguous portions of cluster storage construct 202, e.g., disk portions of 261 are illustrated as contiguous. System 200 further illustrates non-contiguous allocation, e.g., disk portions of 263 are illustrated as contiguous for portions 3.6, 4.6, and 5.6, but non-contiguous with disk portion 7.6. Disk portions of 263 are also illustrative of use of only one disk level of cluster storage construct 202, e.g., all allocated disk portions of 263 are from disk level 6 across four non-contiguous real nodes. Disk portions 267 are similarly non-contiguous and further illustrate that multiple disks of a node of cluster storage construct 202 can be comprised in a mapped cluster, e.g., disks 2-4 of node 6 of cluster storage construct 202 can be comprised in MC 266. It will be noted that other allocations can also be made without departing from the scope of the disclosed subject matter, e.g., another unillustrated mapped cluster can comprise disk portions from cluster storage construct 202 that are each from different nodes and different disk levels, etc., which allocations have not been explicitly recited for the sake of clarity and brevity.

Figure 3:
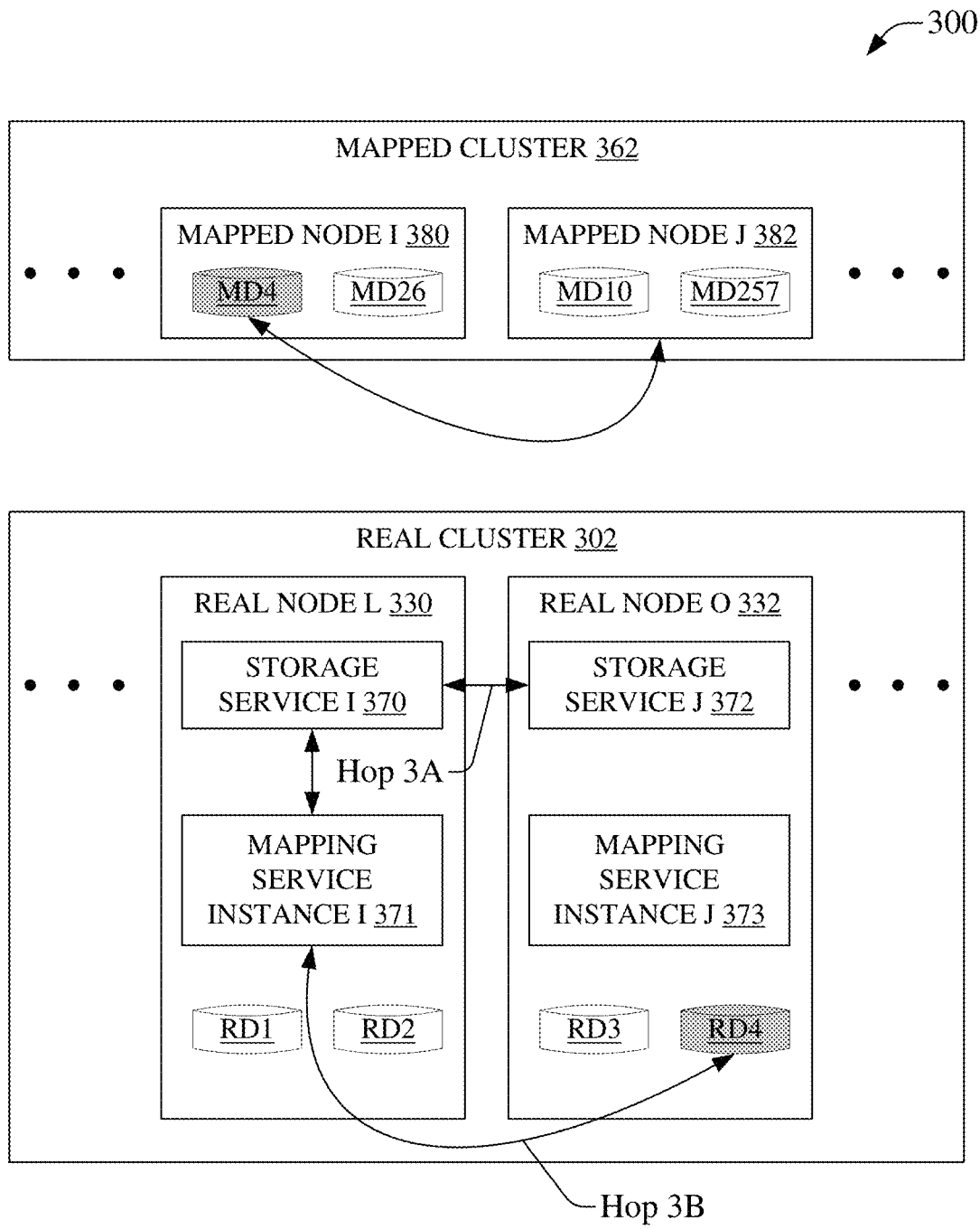
FIG. 3 is an illustration of an example system that can enable a disk access event according to mapped redundant array of independent nodes via real nodes of a real cluster storage system, in accordance with aspects of the subject disclosure.

FIG. 3 is an illustration of a system 300, which can facilitate a disk access event according to mapped redundant array of independent nodes via real nodes of a real cluster storage system, in accordance with aspects of the subject disclosure. System 300 can comprise at least a portion of a cluster storage construct, e.g., real cluster 302, that can comprise real disks, or portions thereof, e.g., real node L 330 can comprise real disk 1 (RD1), RD2, etc.; real node O 332 can comprise RD3, RD4, etc., in a manner that is the same as, or similar to, that illustrated in cluster storage construct 202. A mapped cluster control component can allocate one or more mapped cluster (MC), e.g., MC 362, etc., which allocation can be based on supplemental information received by the mapped cluster control component. A MC can comprise mapped nodes, e.g., mapped node I 380, mapped node J 382, etc., that can comprise mapped disks (MD), e.g., MD4, MD26, MD10, MD257, etc., that map to real disks, e.g., RD1, RD2, . . . RD4, etc., of real nodes, e.g., real node L 330, real node O 332, etc.

Mapped cluster 362 can comprise, for example, MD4 that can map to RD4, e.g., a disk access even corresponding to MD4 can be associated with accessing RD4, etc. This can be facilitated by an instance of a storage service, e.g., storage service I 370 can enable disk access events to RD4 corresponding to a disk access event associated with MD4 that is comprised in mapped node I 380, etc., e.g., a mapped node can employ a storage service executing in a real node to facilitate access to real disks corresponding to the mapped node. As such, storage service I 370 can facilitate disk access events for mapped node I 380, storage service J 372 can facilitate disk access events for mapped node J 382, etc. In an aspect, the real disks corresponding to the mapped disks can, and often are, comprised in real nodes other than the real node executing the corresponding storage service, e.g., mapped node I 380 can comprise MD4 and can be facilitated by storage service I 370 executing on real node L 330 but can enable access to RD4 situated on real node O 332, etc.

Mapping information related to the relationships between mapped disks of mapped nodes and corresponding real disks of real nodes can be stored in a mapping layer entity that can comprise instances of mapping services, e.g., mapping service I 371, mapping service J 373, etc. The mapping service instances, in some embodiment, can be updatable to reflect mapping data, e.g., mapping service instance I 371 can provide the same mapping data as mapping service instance J 373. In an aspect, this can be akin to distributing replicates of the mapping layer across mapping service instances rather than having a central repository of mapping data. However, in some embodiments, a more central mapping data repository can be employed without departing from the scope of the presently disclosed subject matter.

In an aspect, a disk access event between MD4 of mapped node I 380 and, for example, mapped node J 382 can be facilitated by communicating between real node O 332 and real node L 330, e.g., via hop 3A. As an example, reading data from MD4 by mapped node J 382 can comprise communicating data across a network via hop 3A from storage service J 372, executing on real node O 332, to storage service I 370, executing on real node L 330, to determine a location of the corresponding real disk, e.g., RD4, via mapping service instance I 371, to facilitate disk access operations to occur with RD4 back on real node O 332. In this example, writing data from mapped node J 382 to MD4 of mapped node I 380 can comprise storage service J 372, associated with operation of mapped node J 382, communicating over a network with storage service I 370, associated with operation of mapped node I 380, to get an address of RD4, via interrogation of mapping service instance I 371, to enable writing of the data, e.g., via hop 3B, into RD4 as part of the write to MD4 operation, noting that RD4 is comprised in the same real node that is executing storage service J 372.

Figure 4:
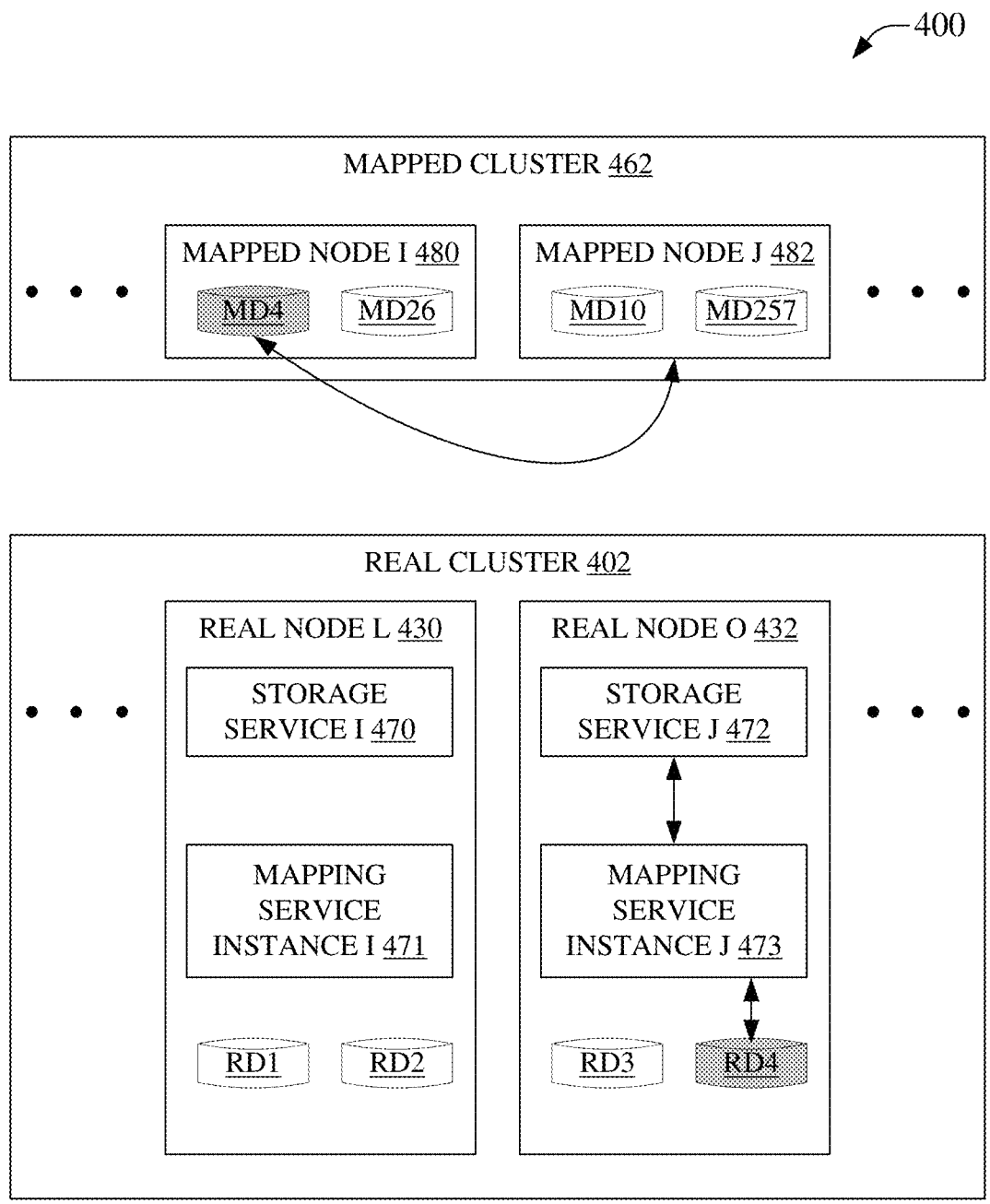
FIG. 4 illustrates an example system that can facilitate a disk access event according to mapped redundant array of independent nodes within a real node of a real cluster storage system, in accordance with aspects of the subject disclosure.

FIG. 4 is an illustration of a system 400, which can enable a disk access event according to mapped redundant array of independent nodes within a real node of a real cluster storage system, in accordance with aspects of the subject disclosure. System 400 can comprise at least a portion of a cluster storage construct, e.g., real cluster 402, that can comprise real disks, or portions thereof, e.g., real node L 430 can comprise real disk 1 (RD1), RD2, etc.; real node O 432 can comprise RD3, RD4, etc., in a manner that is the same as, or similar to, that illustrated in cluster storage construct 202, real cluster 302, etc. A mapped cluster control component can allocate one or more MCs, e.g., MC 462, etc. A MC can comprise mapped nodes, e.g., mapped node I 480, mapped node J 482, etc., that can comprise MDs, e.g., MD4, MD26, MD10, MD257, etc., that can map to real disks, e.g., RD1, RD2, . . . RD4, etc., of real nodes, e.g., real node L 430, real node O 432, etc.

Mapped cluster 462 can comprise, for example, MD4 that can map to RD4, e.g., a disk access even corresponding to MD4 can be associated with accessing RD4, etc. This can be facilitated by an instance of a storage service, e.g., storage service I 470 can enable disk access events to RD4 corresponding to a disk access event associated with MD4 that is comprised in mapped node I 480, etc., e.g., a mapped node can employ a storage service executing in a real node to facilitate access to real disks corresponding to the mapped node. As such, storage service I 470 can facilitate disk access events for mapped node I 480, storage service J 472 can facilitate disk access events for mapped node J 482, etc. In an aspect, the real disks corresponding to the mapped disks can be comprised in nearly any real node of the cluster storage system, e.g., mapped node I 480 can comprise MD4 and can be facilitated by storage service I 470 executing on real node L 430 but can enable access to RD4 situated on real node O 432, etc. Mapping information related to the relationships between mapped disks of mapped nodes and corresponding real disks of real nodes can be stored in one or more instances of mapping services, e.g., mapping service I 471, mapping service J 473, etc.

In an aspect, a disk access event between MD4 of mapped node I 480 and, for example, mapped node J 482 can be facilitated by communicating between real nodes, e.g., as illustrated in FIG. 3, etc., and can alternatively be facilitated by communication within a real node of the real cluster as will be illustrated herein below; In an aspect, avoiding network communication between real nodes to enable a disk access event between mapped clusters, for example, can be faster, cheaper, use less computing resources, etc., than the communication path illustrated in FIG. 3, e.g., there can be reduced demand on networking services, local busses can be faster than network connections, shorter paths can be employed, etc.

As an example, reading data from MD4 by mapped node J 482, similar to, or the same as, the corresponding example in FIG. 3, can comprise communicating data within real node O 432, e.g., via a node bus, etc., from storage service J 472, executing on real node O 432, to mapping service instance J 473, also executing on real node O 432, to determine a location of the corresponding real disk, e.g., RD4, via, to facilitate disk access operations to occur with RD4 on real node O 432 without needing to communicate to storage service I 470 that is associated with mapped node I 480. In an aspect, storage service J 472 can determine the mapping between MD4 and RD4 via any instance of a mapping service where the mapping services provide the same mapping data, and thus can avoid internode communications between storage service J 472 and storage service I 470 to access this example same mapping information from mapping service instance I 471. Where the mapping data, for example, indicates that RD4 is collocated with storage service J 472, e.g., both are resident on real node O 432, the disk access event between mapped node J 482 and MD4 of mapped node I 480 can be facilitated within real node O 432. This can be in contrast to the example illustrated in FIG. 3 that can comprise network hops to communicate data between real nodes to perform a same, or at least similar, disk access event.

Figure 5:
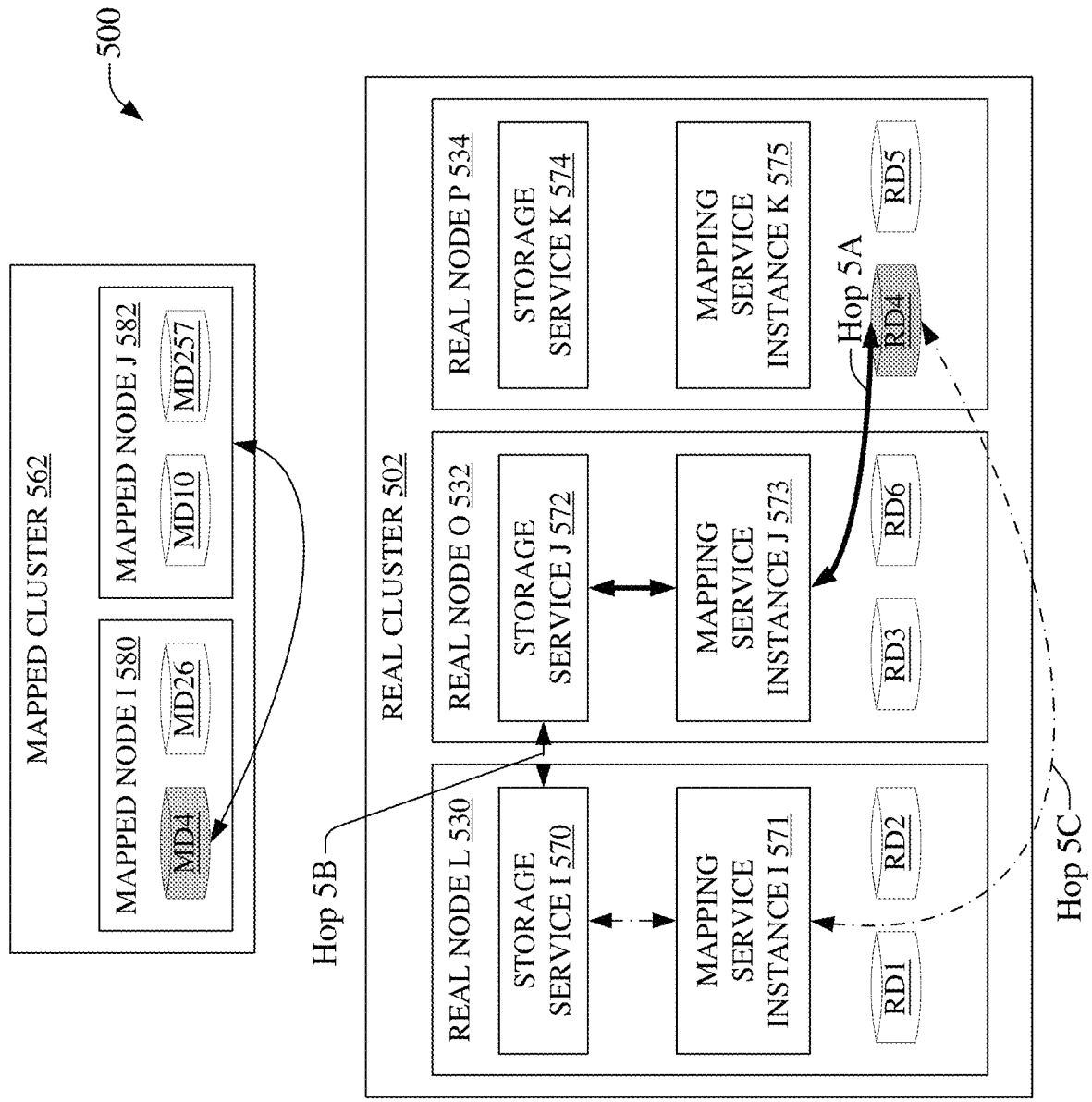
FIG. 5 is an illustration of an example system that can facilitate a disk access event according to mapped redundant array of independent nodes via alternate real nodes of a real cluster storage system, in accordance with aspects of the subject disclosure.

FIG. 5 is an illustration of a system 500, which can enable a disk access event according to mapped redundant array of independent nodes via alternate real nodes of a real cluster storage system, in accordance with aspects of the subject disclosure. System 500 can comprise at least a portion of a cluster storage construct, e.g., real cluster 502, that can comprise real disks, or portions thereof, e.g., real node L 530 can comprise RD1, RD2, etc.; real node O 532 can comprise RD3, RD6, real node P 534 can comprise RD4, RD5, etc., in a manner that is the same as, or similar to, that illustrated in cluster storage construct 202, real cluster 302, 402, etc. A mapped cluster control component can allocate one or more MCs, e.g., MC 562, etc. A MC can comprise mapped nodes, e.g., mapped node I 580, mapped node J 582, etc., that can comprise MDs, e.g., MD4, MD26, MD10, MD257, etc., that can map to real disks, e.g., RD1, RD2, . . . RD6, etc., of real nodes, e.g., real node L 530, real node O 532, real node P 534, etc.

Mapped cluster 562 can comprise, for example, MD4 that can map to RD4, e.g., a disk access even corresponding to MD4 can be associated with accessing RD4, etc. This can be facilitated by an instance of a storage service, e.g., storage service I 570 can enable disk access events to RD4 corresponding to a disk access event associated with MD4 that is comprised in mapped node I 580, etc., e.g., a mapped node can employ a storage service executing in a real node to facilitate access to real disks corresponding to the mapped node. As such, storage service I 570 can facilitate disk access events for mapped node I 580, storage service J 572 can facilitate disk access events for mapped node J 582, storage service K 574 can facilitate disk access events for a mapped node K that not illustrated for clarity and brevity, etc. In an aspect, the real disks corresponding to the mapped disks can be comprised in nearly any real node of the cluster storage system, e.g., mapped node I 580 can comprise MD4 and can be facilitated by storage service I 570 executing on real node L 530 but can enable access to RD4 situated on real node P 534, etc. Mapping information related to the relationships between mapped disks of mapped nodes and corresponding real disks of real nodes can be stored in one or more instances of mapping services, e.g., mapping service I 571, mapping service J 573, mapping service K 575, etc.

In an aspect, a disk access event between MD4 of mapped node I 580 and, for example, mapped node J 582 can be facilitated by communicating between real nodes, e.g., as illustrated in FIG. 3, etc., can be facilitated by communication within a real node of the real cluster, e.g., as is illustrated in FIG. 4, etc., and can be can be facilitated by communication from a storage service instance to another real node of the real cluster as is illustrated in more detail herein below. In an aspect, this can reduce network communication between real nodes enabling a disk access event between mapped clusters, for example, the disk access can be faster, cheaper, use less computing resources, etc., than the communication path illustrated in FIG. 3, etc.

As an example, reading data from MD4 by mapped node J 582, similar to, or the same as, the corresponding example in FIGS. 3, 4, etc., can comprise communicating data within real node O 532, e.g., from storage service J 572, executing on real node O 532, to mapping service instance J 573, also executing on real node O 532, to determine a location of the corresponding real disk, e.g., RD4, to facilitate disk access operations to occur with RD4 on real node P 534 without needing to communicate to storage service I 570 that is associated with mapped node I 580. In an aspect, storage service J 572 can determine the mapping between MD4 and RD4 via any instance of a mapping service where the mapping services provide the same mapping data, and thus can avoid internode communications between storage service J 572 and storage service I 570 to access this example same mapping information from mapping service instance I 571. Where the mapping data that can be accessed by any of mapping service instance I 571, mapping service instance J 573, mapping service instance K 575, etc., for example, indicates that RD4 is located at real node P 534, the disk access event between mapped node J 582 and MD4 of mapped node I 580 can be facilitated within real node P 534, e.g., only one network hop, hop 5A, can be associated with initiating the example disk access event. This can be in contrast to an example similar to that illustrated in FIG. 3 that can comprise more network hops to communicate data between real nodes to perform a same, or at least similar, disk access event, e.g., storage service J 572, to storage service I 570 via hop 5B, then storage service I 570 to mapping service instance I 571 to determine the mapping of MD4 to RD4, then from real node L 530 to RD4 of real node P 534, via hop 5C, etc. In this counter example, twice the hops are employed to achieve a similar disk access event result. Accordingly, the use of a local instance of a mapping service by a storage service can provide improvements to the operation of the disclosed cluster storage system.

Figure 6:
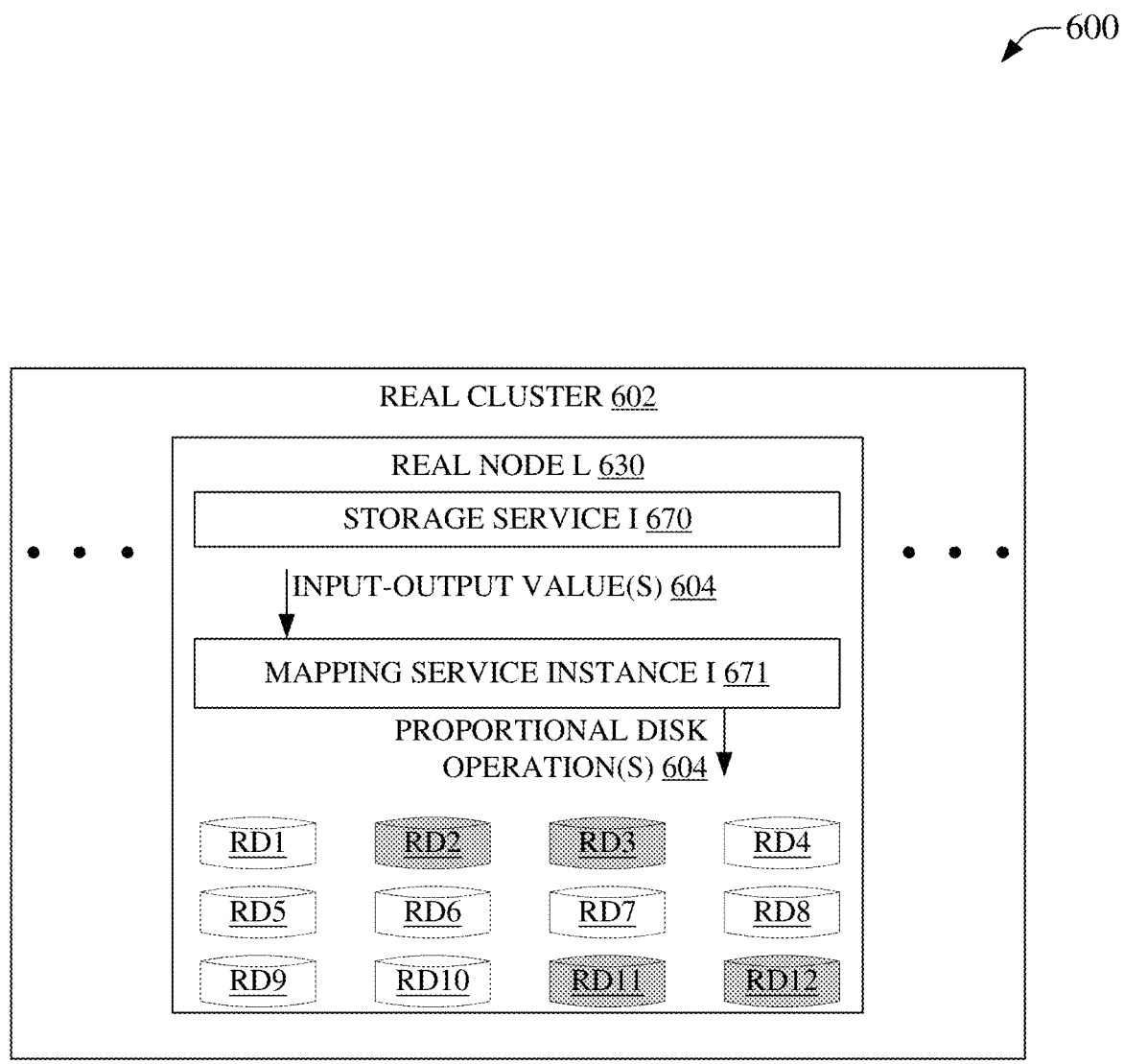
FIG. 6 illustrates an example system that can facilitate proportional disk access events according to mapped redundant array of independent nodes via real nodes of a real cluster storage system, in accordance with aspects of the subject disclosure.

FIG. 6 is an illustration of a system 600 that can enable proportional disk access events according to mapped redundant array of independent nodes via real nodes of a real cluster storage system, in accordance with aspects of the subject disclosure. System 600 can comprise cluster storage construct 602 that can comprise real nodes, e.g., real node L 630, etc. A real node can comprise an instance of a storage service supporting a mapped node, e.g., storage service I 670 can support a mapped node I, not illustrated for clarity and brevity. In an aspect, a storage service instance can communicate with a mapping service instance, e.g., mapping service instance 671, etc., to determine a correspondence between a real disk, e.g., any of RD1-RD12, etc., and a mapped disk, again not illustrated for clarity and brevity. In an embodiment, the storage service can communicate with other storage services, e.g., as illustrated in FIGS. 3, 5, etc.

In an aspect, a mapping service instance, e.g., mapping service instance I 671, etc., can receive input-output (IO) value(s) 604 that, for example, can correspond to a duration of an IO event, e.g., how much time is used to write, read, move, delete, copy, etc., data at a real disk based on a mapped disk access event, etc. As an example, a series of incoming data packets for a mapped disk can be written to a corresponding real disk, whereby the time to write each of these packets can be regarded as an IO value, e.g., IO value(s) 604. In an aspect, these times can be averaged, e.g., a floating window average, etc., to yield another IO value. Where, for example we use an average of the last 100 write time IO values, mapping service instant I 671 can based future writing data access operations on the averaged write time. This can be associated with providing access to proportional disk operation(s) 604 information, e.g., the average write time can be employed to facilitate future write operations according to the average write time, such as prioritizing some writes above other writes, etc.

In an embodiment, proportional disk operation(s) 604 can be employed to adapt disk access. As is illustrated in FIG. 6 by the shaded and unshaded real disks, a first number of real disks associated with a first mapped node and a second number of real disks associated with a second mapped node can be determined. In some embodiments this can lead to determining a proportion of real disks supporting different mapped nodes. It is noted that not all real nodes will support only two mapped nodes, e.g., some real nodes can support one, two, or more mapped nodes. In an embodiment, the supported mapped nodes can be from one mapped cluster to avoid certain potential data loss events associated with a real node becoming less available and affecting more than one mapped cluster, not illustrated for clarity and brevity. As an example, FIG. 6 can illustrate a first mapped node corresponding to the unshaded real disks of real node L 630, e.g., RD1 and RD4-RD10, etc., while a second mapped node, typically of the same mapped cluster, can correspond to the shaded real disks, e.g., RD2, RD3, RD11, and RD12, etc. It can then be appreciated that, in this example, the first mapped node maps to twice the real disks in real node L 630 as compared to the second mapped node.

Continuing the above example, where all mapped nodes get one data write per unit time, and the average write time to all real disks is equivalent, then it can be surmised that there will be twice the write events the unshaded real disks as for the shaded real disks, e.g., the unshaded real disks in sum will consume twice the write time of the shaded real disks. In this example, where the writes can occur without creating a backlog of write events, e.g., there are sufficient computing resources to avoid queueing write events, these example write events can occur according to a first in-first out (FIFO) scheme. However, in this example, where not all of the writes can occur in a unit time, a queue of write events can begin to accumulate. In an aspect, the queue can be depleted according to a FIFO scheme, however, where the unshaded real disk writes arrive first in each unit time, this can push the shaded real disk writes into a condition where they do not occur fast enough and accrue up disproportionately in the queue. As such, it can be desirable to use the proportional disk operation(s) 604 information to modify a queue away from a simple FIFO to a proportionate disk access event scheme, e.g., in the above example, for every two unshaded writes, a shaded write can be performed so that the queue will grow, and be depleted, proportionate to numbers of the real disks supporting different mapped disks. In an aspect, a threshold value can be used to transition between a FIFO and a proportionate disk access event scheme. In some embodiments, the threshold can be nil, such that only a proportional disk access event scheme is employed. In other embodiments, a threshold, for example, can be the occurrence of queued disk access operations. As other examples, the threshold can be set to a level just below or above an occurrence of queueing disk access operations, at a selectable count of queued disk access operations, such as 1000 queued disk access operations, etc.

In an aspect, determine the proportional disk operations(s) 604 can facilitate changes in performance of components of a real node. As an example, where RD1 becomes a very slow disk, e.g., disk access into RD1 increases disproportionate to other real disks, this can cause significant slowing of disk access operations for the mapped node corresponding to the unshaded real disks. Where, for example, a FIFO scheme is employed, the disk operations can rapidly accrue due to the slowed disk, which can therefore affect the performance of both mapped nodes, e.g., the backlog of operations for the unshaded real disks can delay the operations for the shaded real disks which can result in degradation of performance for both corresponding mapped disks. In contrast, determining IO value(s) 604 for the example slowed RD1 can result in proportional disk operation(s) 604 information that can facilitate proportionate disk operations such that the slowed writes to the unshaded real disks can be shifted to occur after the faster writes to the shaded real disks. Moreover, the proportion of example writes can be adjusted to allow a queue of writes to the shaded real disks to remain below a threshold level while still allowing for some of the writes to the unshaded real disks to occur.

Figure 7:
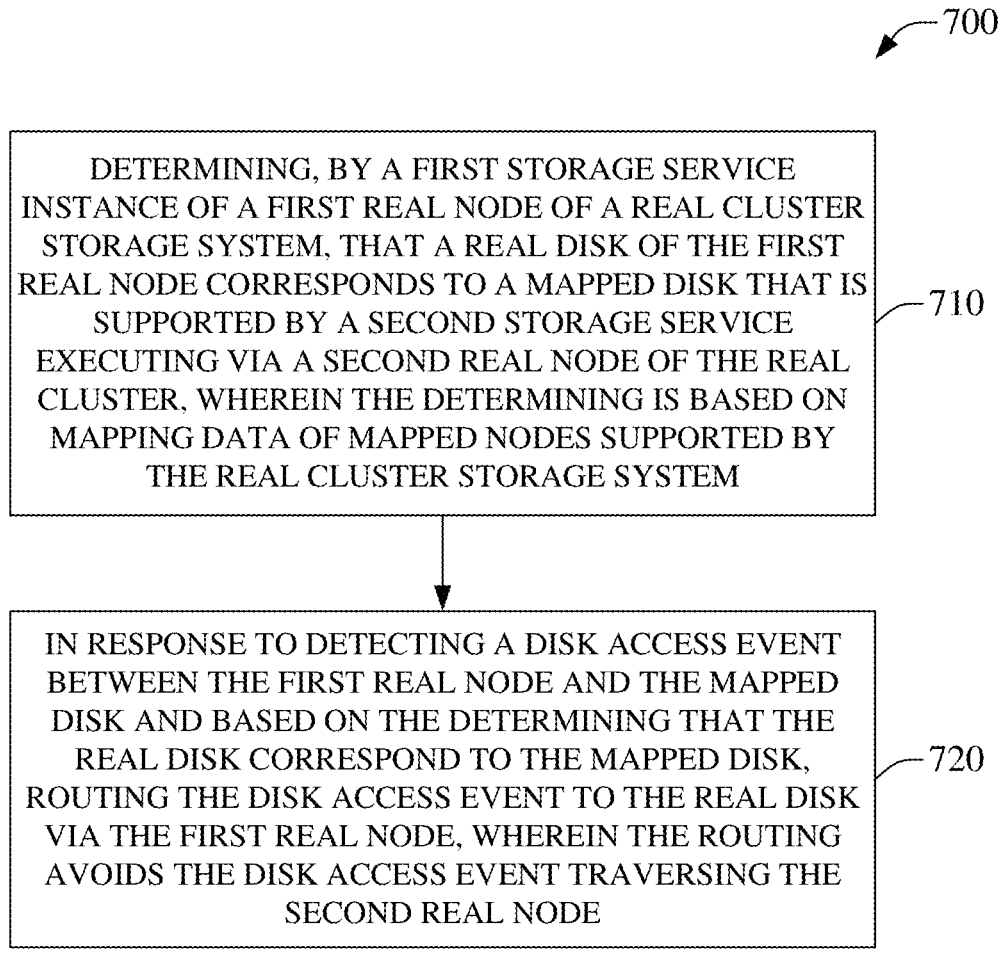
FIG. 7 is an illustration of an example method facilitating a disk access event according to mapped redundant array of independent nodes within a real node of a real cluster storage system, in accordance with aspects of the subject disclosure.
Figure 8:
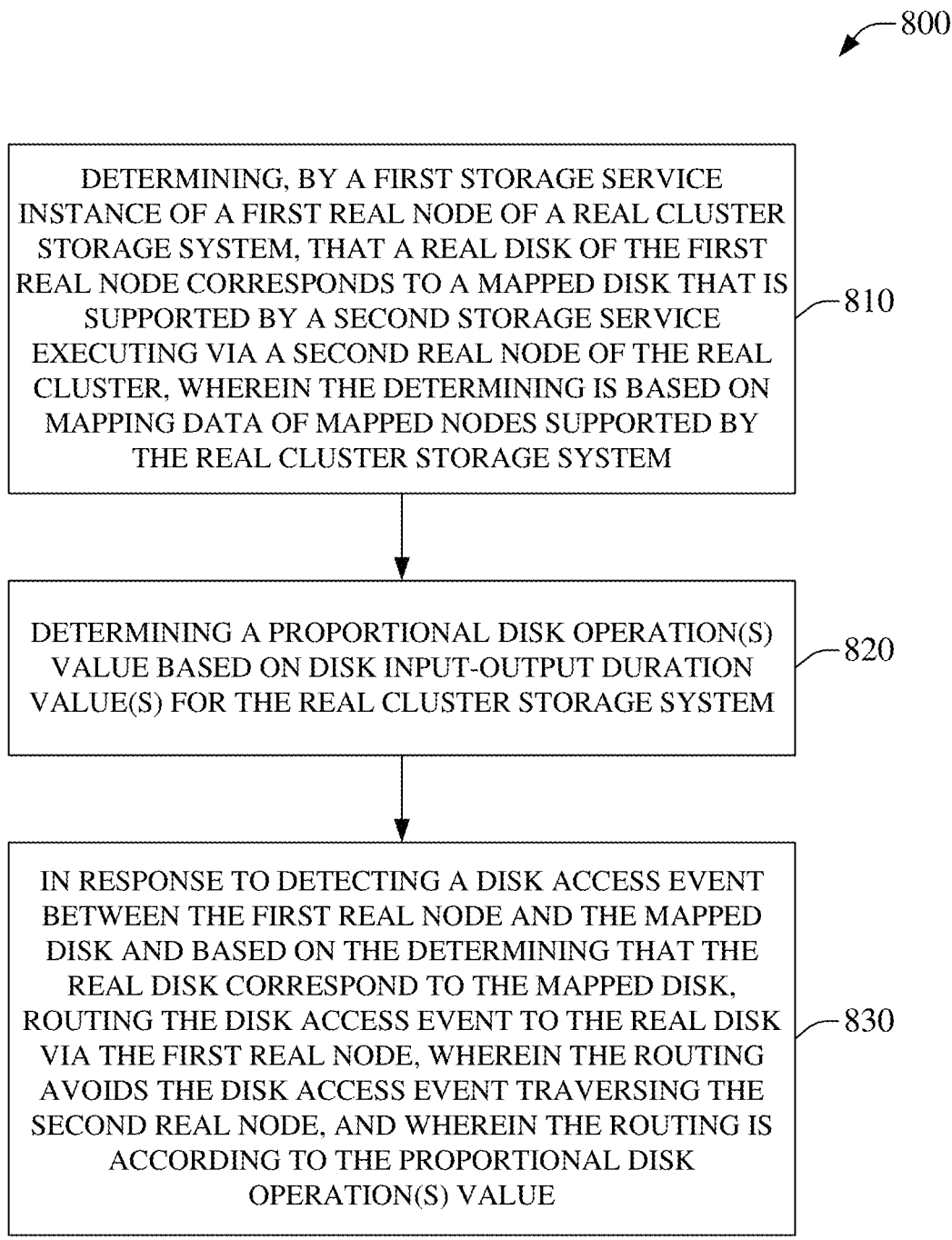
FIG. 8 illustrates an example method that enables a proportional disk access operation according to mapped redundant array of independent nodes via a real node of a real cluster storage system, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate a disk access event according to mapped redundant array of independent nodes within a real node of a real cluster storage system, in accordance with aspects of the subject disclosure. At 710, method 700 can comprise determining that a real disk of a first real node corresponds to a mapped disk that is supported by a second storage service executing via a second real node. The determining can be performed by a first storage service instance of a first real node of a real cluster storage system. The determining can be based on mapping data of mapped nodes supported by the real cluster storage system. In an embodiment, the mapping data can be accessed by a mapping service instance, e.g., mapping service instance 371, 372, 471, 473, 571, 573, 575, etc. In an embodiment, the real disk can be comprised in the first real node, e.g., the same as, or similar to, the system illustrated in FIG. 4. In another embodiment the real disk can be comprised in a third real node, e.g., the same as, or similar to, the system illustrated in FIG. 6.

Method 700, at 720, can comprise routing a disk access even to the real disk via the first real node. At this point, method 700 can end. The routing can be in response to detecting a disk access event between the first real node and the mapped disk and can be based on the determining that the real disk corresponds to the mapped disk. The routing can avoid the disk access event traversing the second real node, e.g., the first storage service can manage the routing rather than having the second storage service manage the routing. The disclosed method can facilitate performing a disk access event with fewer network communications than can be associated with first communicating to the second storage service. This can result in faster operations, more efficient use of computing resources, e.g., reducing use of network, processor, storage, etc., computer resources. This can be true for embodiments in which the real disk is comprised in the first real node, for embodiments in which the real disk is comprised in the third real node, etc.

FIG. 8 is an illustration of an example method 800, which can enable a proportional disk access operation according to mapped redundant array of independent nodes via a real node of a real cluster storage system, in accordance with aspects of the subject disclosure. At 810, method 800 can comprise determining that a real disk of a first real node corresponds to a mapped disk that is supported by a second storage service executing via a second real node. The determining can be performed by a first storage service instance of a first real node of a real cluster storage system. The determining can be based on mapping data of mapped nodes supported by the real cluster storage system. In an embodiment, the mapping data can be accessed by a mapping service instance, e.g., mapping service instance 371, 372, 471, 473, 571, 573, 575, etc. In an embodiment, the real disk can be comprised in the first real node, e.g., the same as, or similar to, the system illustrated in FIG. 4. In another embodiment the real disk can be comprised in a third real node, e.g., the same as, or similar to, the system illustrated in FIG. 6.

Method 800, at 820, can comprise determining a proportional disk operation(s) value based on disk IO duration value(s) for real cluster storage system. In an aspect, As an example, a time used to write, read, move, delete, copy, etc., data at a real disk based on a mapped disk access event can be determined, e.g., a floating window average, etc. This example average time can be associated with proportionally enabling future disk access events, e.g., an average write time can be employed to facilitate future write operations according to the average write time, such as prioritizing some writes above other writes, etc. As an example, in FIG. 6, a first mapped node can corresponding to the unshaded real disks while a second mapped node can correspond to the shaded real disks, whereby the first mapped node maps to twice the real disks as the second mapped node, such that the writes can be proportioned 2:1 for the first and second mapped nodes correspondingly. In an aspect, a threshold value can be used to trigger the use of the proportionate disk operation(s).

At 830, method 800 can comprise routing a disk access even to the real disk via the first real node. At this point, method 800 can end. The routing can be in response to detecting a disk access event between the first real node and the mapped disk and can be based on the determining that the real disk corresponds to the mapped disk. The routing can avoid the disk access event traversing the second real node, e.g., the first storage service can manage the routing rather than having the second storage service manage the routing. The disclosed method can facilitate performing a disk access event with fewer network communications than can be associated with first communicating to the second storage service. This can result in faster operations, more efficient use of computing resources, e.g., reducing use of network, processor, storage, etc., computer resources. This can be true for embodiments in which the real disk is comprised in the first real node, for embodiments in which the real disk is comprised in the third real node, etc.

Figure 9:
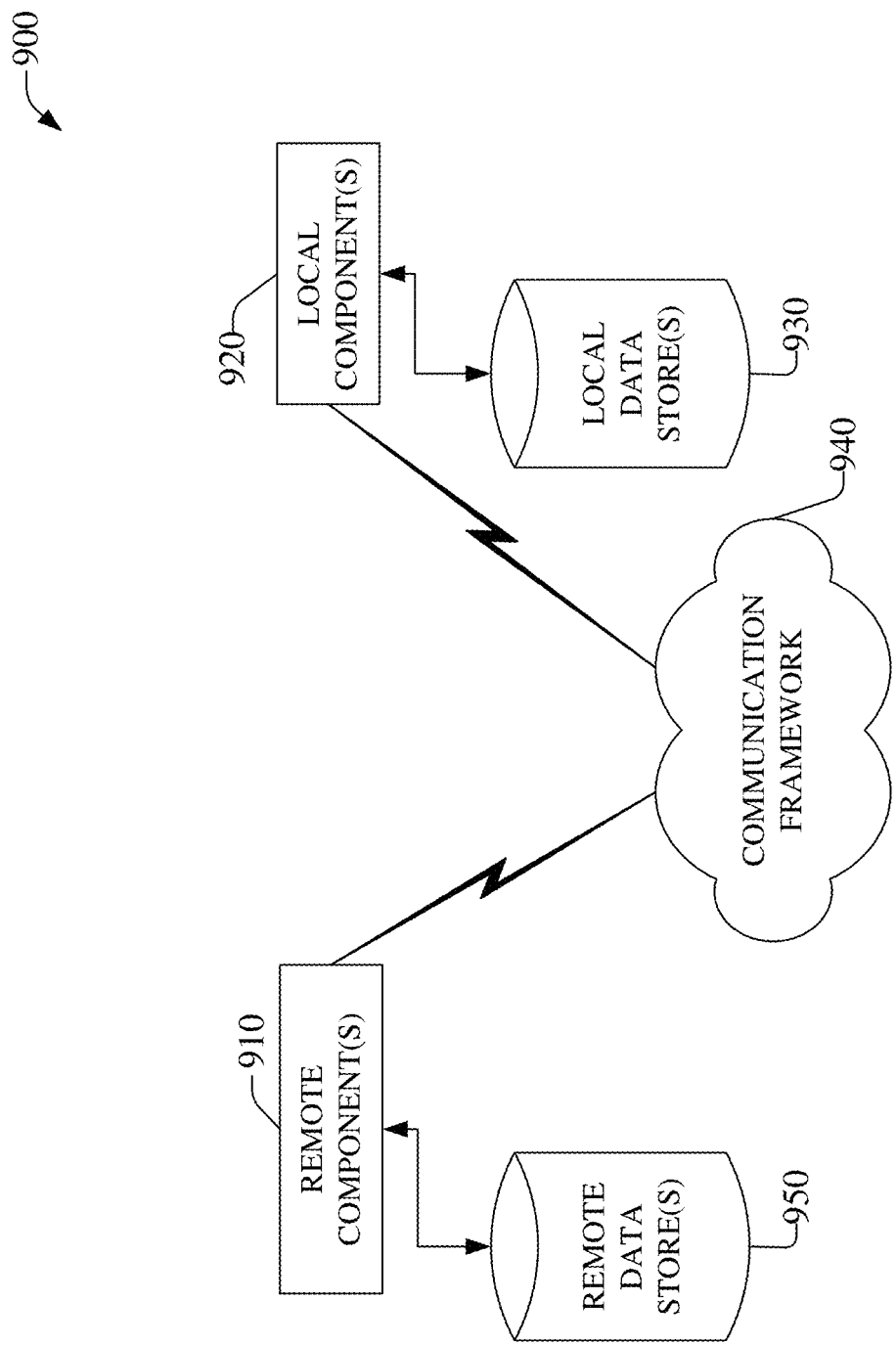
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device, e.g., embodied in a cluster storage construct, such as 140-148, 150-158, 130-138, 110-118, etc., connected to a local mapped cluster control component, e.g., embodied in a cluster storage construct, such as 140-148, 150-158, 130-138, 110-118, etc., via a communication framework, e.g., 940, etc. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local mapped cluster control component, e.g., embodied in a cluster storage construct, such as 140-148, 150-158, 130-138, 110-118, etc., connected to a remotely located storage devices via communication framework 940. In an aspect the remotely located storage devices can be embodied in a cluster storage construct, e.g., embodied in a cluster storage construct, such as 140-148, 150-158, 130-138, 110-118, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to a mapped data storage location can be communicated via communication framework 940 to other devices, e.g., to facilitate access to a real data storage location, as disclosed herein.

Figure 10:
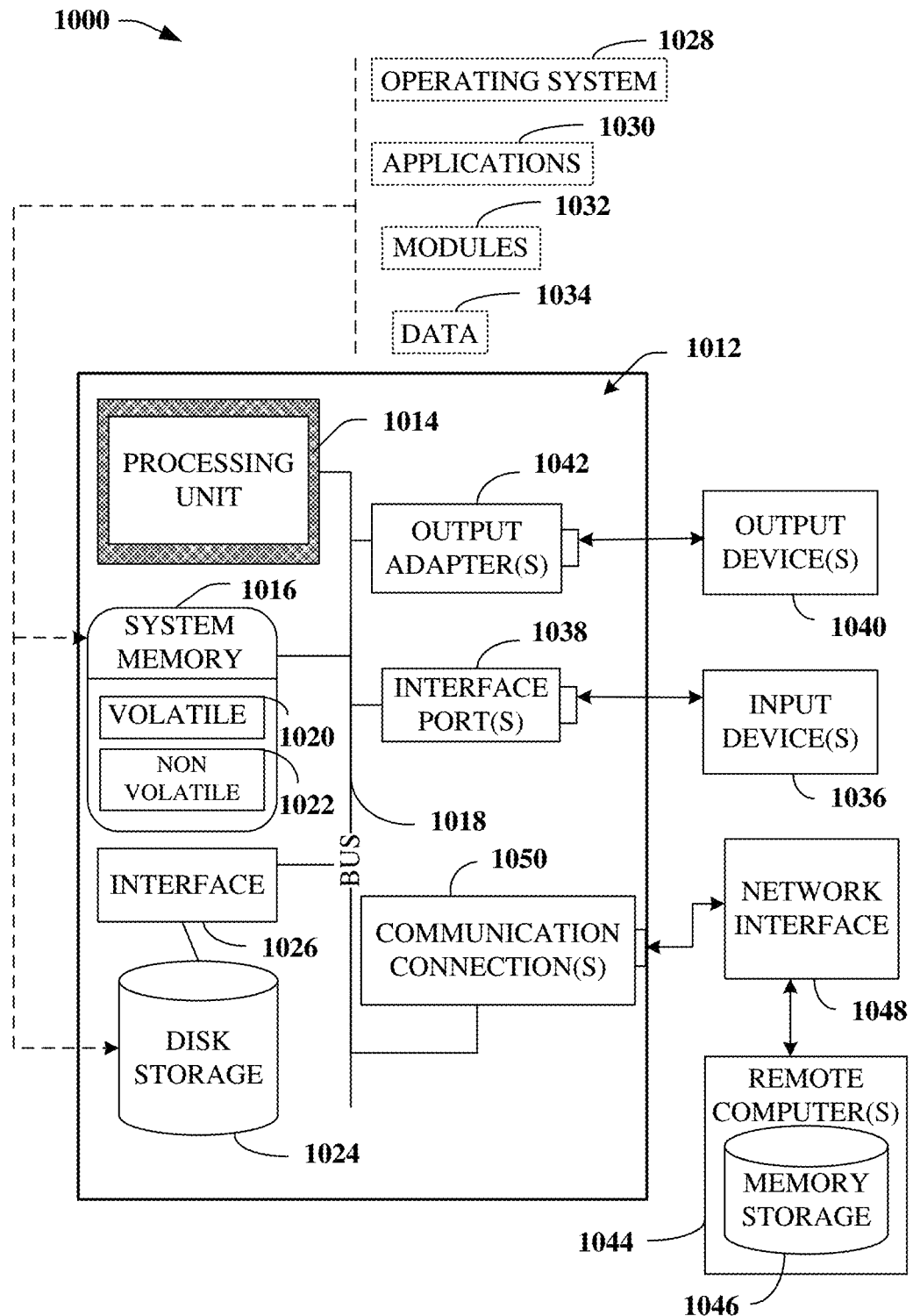
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct, such as 102, 202, etc., in mapped cluster control component, e.g., 220, etc., in a real node, such as 130-138, 330-332, 430-432, 530-534, 630, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining that a real disk corresponds to a mapped disk that can be supported by a second storage service of a second real node of the real cluster storage system. The determining can be in response to detecting a disk access event at a first storage service instance of a first real node of a real cluster storage system. Moreover, the determining can be based on mapping data of mapped nodes supported by the real cluster system. The operations can further comprise indicating that the disk access event operation is to be performed via the real disk without engaging the second storage service instance of the second real node, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining, by a first storage service instance of a first real node of a real cluster storage system, that a real disk corresponds to a mapped disk that is supported by a second storage service of a second real node of the real cluster storage system, wherein the first real node comprises a first plurality of real disks comprising the real disk, wherein the second real node comprises a second plurality of real disks different than the first plurality of real disks, wherein the second real node comprises a second mapping service instance that is a different mapping service instance than the first mapping service instance, and wherein the first storage service applies a protective mapping scheme, for a mapped node comprising the mapped disk, where the protective mapping scheme prevents a mapping of a primary instance of data and redundant information, which corresponds to the primary instance of the data, to a same real node and thereby reduces a likelihood of a data loss event occurring through inaccessibility to both the primary instance of the data and the redundant information as a result of the same real node becoming inaccessible at a future time;
receiving an indication of a disk access event operation at the first real node; and
routing the disk access event operation to the real disk without traversing the second real node, wherein the routing is supported by the first mapping service instance rather than the second mapping service instance.

2. The system of claim 1, wherein the determining is based on mapping data of mapped nodes supported by the real cluster system, wherein the mapping of the data is in accord with the protective mapping scheme, and wherein the mapping data is accessed via the first mapping service instance, and wherein the mapped nodes comprise the mapped disk.

3. The system of claim 1, wherein the real disk is comprised in the first real node.

4. The system of claim 1, wherein the real disk is comprised in a third real node of the real cluster storage system.

5. The system of claim 1, wherein the routing is in response to detecting a disk access event corresponding to the disk access event operation.

6. The system of claim 1, wherein the routing is based on the determining, via the first mapping service instance, that the real disk corresponds to the mapped disk.

7. The system of claim 1, wherein the routing avoids the disk access event operation traversing the second real node.

8. The system of claim 1, wherein the operations further comprise determining a proportional disk operation value, and wherein the disk access event is performed according to the proportional disk operation value.

9. The system of claim 8, wherein the disk operation value is based on an input-output value of historical disk access operations.

10. The system of claim 9, wherein the input-output value of historical disk access operations reflects an average time to perform a disk access event.

11. The system of claim 10, wherein the average time to perform a disk access event is a floating window time average value to perform a disk access event.

12. A method, comprising:
determining, by a processor of a first real node of a real cluster storage system executing a first storage service instance and based on mapping data of mapped nodes supported by the real cluster system, that a real disk corresponds to a mapped disk that is supported by a second storage service of a second real node of the real cluster storage system, wherein the real node comprises a first plurality of real disks and a first mapping service instance that is a different mapping service instance than a second mapping service instance comprised in the second real node that comprises a second plurality of real disks different than the first plurality of real disks, wherein the mapping prevents a primary instance of data and corresponding redundant information being mapped to a same real node in accord with a data loss protection rule, and wherein the first mapping service instance enables access to the mapping data local to the first real node instead of being via the second real node; and
initiating, by the processor, the disk access event operation at the real disk.

13. The method of claim 12, wherein initiating the disk access event operation comprises initiating the disk access event operation at the first real node because the first real node comprises the real disk.

14. The method of claim 12, wherein the initiating the disk access event operation comprises initiating the disk access event operation at a third real node because the third real node comprises the real disk, and wherein the third real node is comprised in the real cluster storage system.

15. The method of claim 12, wherein the initiating the disk access event operation comprises bypassing the second storage service instance of the second real node.

16. The method of claim 12, wherein the initiating the disk access event operation comprises initiating the disk access event operation according to a proportional disk operation value determined from historical disk input-output event characteristics.

17. A non-transitory machine-readable storage medium, comprising executable instructions that, when executed by a processor, facilitate performance of operations, comprising:
in response to detecting a disk access event at a first storage service instance of a first real node of a real cluster storage system, determining that a real disk corresponds to a mapped disk that is supported by a second storage service of a second real node of the real cluster storage system, wherein the first real node comprises a first plurality of real disks that are different real disks than a second plurality of real disks comprised in the second real node, wherein the determining is based on mapping data of mapped nodes supported by the real cluster system that prevents a primary instance of data and corresponding redundant information from being mapped to a same real node in accord with a data loss protection rule, and wherein the mapping data is accessed via a first mapping service instance that is a different mapping service instance than a second mapping service instance executing in the second real node, and wherein the first mapping service instance enables access to the mapping data local to the real node rather than via the second real node; and
indicating that the disk access event operation is to be performed via the real disk without engaging the second storage service instance of the second real node.

18. The non-transitory machine-readable storage medium of claim 17, wherein the real disk is comprised in the first real node.

19. The non-transitory machine-readable storage medium of claim 17, wherein the real disk is comprised in a third real node of the real cluster storage system.

20. The non-transitory machine-readable storage medium of claim 18, wherein the operations further comprise:
determining a proportional disk operation value based on a time windowed average duration of historical disk input-output operations, and wherein the disk access event is performed according to the proportional disk operation value.

* * * * *